United States Patent Office 3,484,256
Patented Dec. 16, 1969

3,484,256
FIBROUS FOOD CASINGS AND METHOD OF PRODUCING SAME
Herman S. Chiu and Frank T. Kambara, Chicago, Ill., assignors to Union Carbide Corporation, a corporation of New York
No Drawing. Filed Jan. 31, 1967, Ser. No. 612,828
Int. Cl. B65b 25/06, 25/22; B65d 65/42
U.S. Cl. 99—171                                    15 Claims

ABSTRACT OF THE DISCLOSURE

This disclosure sets forth a manner of treating fibrous paper webs which are utilized in fabricating fibrous food casings. The fibrous paper webs are treated with a bonding agent comprising two compatible resins to enhance the physical properties of the fibrous paper webs and the physical properties of the food casings fabricated therewith.

---

The present invention relates to methods of preparing fibrous webs utilized in the production of fibrous food casings. More particularly, the present invention relates to methods of preparing these fibrous webs so that they will exhibit improved extensibility characteristics from which fibrous food casings having greater dimensional uniformity can be obtained.

As used throughout this application and in the appended claims, it should be understood that the term "fibrous food casing" refers to and is intended to include those food casings fabricated from materials approved for use in connection with food items. Cellulose and regenerated cellulose having fibrous webs embedded therein and which are employed as containers or molds for food emulsions subsequently stuffed therein are exemplary of such materials and the fibrous food casings fabricated therefrom. Upon being stuffed with a food emulsion, these food casings are then subjected to curing, cooking and other processing methods well known to those skilled in the art in order to cook and cure the food emulsion stuffed therein and ultimately obtained a food product.

The term "food emulsion," as used throughout this application and in the appended claims, should also be understood as referring to such food compositions as meat emulsions, discrete meat particles, meat emulsions containing particles or chunks of meat therein and the like and from which food products such as sausages, Lebanon bologna, spiced hams, bologna and the like are obtained.

The paper webs utilized in fabricating fibrous food casings are commercially formed on conventional paper making machines wherein long fibers are beat into a slurry and then formed into webs and dried. The fibrous or paper web is then passed through or contacted with a dilute viscose solution and again dried whereupon the cellulose is partially regenerated. The cellulose in the viscose can be further regenerated by passing the paper web through dilute acid solutions and finally a washing solution. The thusly treated paper web is then dried and cut into unit widths from a master roll to provide lesser rolls which are then utilized in the manufacture of fibrous food casings.

The methods employed to produce these paper webs are controlled so that the regenerated cellulose incorporated therein and acting as a binding agent is present in the paper web in an amount sufficient to increase the wet strength of the paper without materially filling the pores and interstices thereof, thus retaining the porosity characteristic of the paper web. The amount of bonding cellulose used in forming the paper web is kept at a level so that a subsequent impregnant, such as viscose which is conventionally utilized to make the cellulosic casing, will be absorbed in the fibers as well as the interstices of the paper. Thus, the porosity characteristic is a critical feature of the paper webs utilized in producing fibrous food casings. One method which can be employed to treat paper webs in this manner is set forth in the U.S. Patent to Underwood (3,135,613).

The extensibility property of fibrous food casings generally governs the size and shape of the encased food products processed therein. The extensibility property is known to be directly related to the paper web utilized as the substrate in these fibrous food casings. Variations in the extensibility of the paper webs are reflected in the fibrous food casings obtained therefrom and give rise to poor size control of the encased food products processed in the fibrous food casings. This, in turn, results in difficulty when specified size and weight standards of food products obtained therein are desired or required. This is particularly important to the food packager who subsequently slices or reduces the size of the food product into smaller packaged units utilized in retail sales.

Due to the bonding processes presently employed (as described hereinabove), the paper webs employed in the production of fibrous food casings vary in extensibility in the transverse direction of the web to a significantly greater degree than do other commercially produced papers. At the transverse ends of the paper web, the degree of extensibility is found to be higher than that found in the center portion of the web.

In practice, the widths of paper webs utilized in producing fibrous food casings are generally obtained from a master roll by slitting it into a number of lesser rolls having narrower widths which correspond to the desired casing size to be produced. Therefore, the narrower width papers utilized in producing a particular casing size can be selected from both the center and end cut locations of the master roll. Under these conditions, it has been found that the fibrous food casings obtained therefrom exhibit wide variations in extensibility although they are, ostensibly, the same size. By specifying that the lesser roll paper webs be selected only from certain cut locations on the master roll, it is possible to minimize the variations in extensibility of the fibrous food casings obtained therefrom. However, this type of selectivity is not commercially or economically practicable and is operably feasible for only a few, select casing sizes.

In an effort to minimize or eliminate the wide variations of extensibility in the transverse direction of the master roll paper web and thereby improve the uniformity of extensibility of fibrous food casings produced therefrom in order to ultimately obtain food products which would exhibit dimensional uniformity, alternative materials for bonding the paper webs were investigated other than the commercially employed acid-regenerated viscose presently utilized for this purpose. In selecting bonding materials for this purpose, it is important that the bonding materials meet the conditions necessary to be satisfied regarding the processing and performance requirements of the fibrous food casings produced therefrom. In particular, the paper web in which the bonding agent is to be incorporated must exhibit sufficient strength to withstand the stresses exerted during the coating operation utilized in producing fibrous food casings; the amount of bonding agent to be employed cannot interfere with subsequent viscose penetration during the casing manufacturing process so that there is a resulting loss of strength of the casing produced or the appearance of the casing obtained is detrimentally affected; and, the bonding agent should be one which will not cause the paper web to become discolored during exposure of the paper web to the conditions of the casing process.

It has now been found that the requirements and conditions listed above can be met by utilizing a mixture comprising a cationic thermosetting resin and a polyacrylamide resin as the bonding agent for the paper web. Use of this resinous mixture as the bonding agent surprisingly results in a synergistic effect in improving the overall properties of the paper web.

The cationic thermosetting resins and the polyacrylamide resins comprising the bonding agent mixture are each commercially obtainable and are those which can be cured to an insoluble state but which are compatible with water; that is, they are water soluble or water dispersible in the uncured state. Examples of the cationic thermosetting resins that can be used are those selected from the group of resins consisting of the reaction products of an epichlorohydrin and polyamide, a modified melamine and formaldehyde and a modified urea and formaldehyde.

A method of preparing the epichlorohydrin-polyamide compositions is disclosed in U.S. Patent No. 2,926,154; a method of preparing the cationic melamine-formaldehyde thermosetting resin is described in U.S. Patent No. 2,796,362; and a method of preparing urea-formaldehyde thermosetting resins is set forth in U.S. Patent No. 2,616,874.

The polyacrylamide resin that can be employed in the present invention can be either the ionic or non-ionic form thereof. Although both forms of the polyacrylamide resin are generally compatible with cationic thermosetting resins, the non-ionic form of polyacrylamide resin is preferred since it has been found to be compatible with a cationic thermosetting resin over a wider range of concentrations than the ionic form of polyacrylamide resin.

The bonding agent mixture comprising a cationic thermosetting resin and a polyacrylamide resin can be utilized to treat paper webs either by adding the resinous mixture to the fibrous slurry prior to formation of the paper webs, or by treating the dried or semi-dried, formed paper web with the resinous mixture in solution, such as by saturating the formed paper webs, or by a combination of these methods. In a preferred embodiment, the formed, semi-dried paper web is saturated with a mixture of the resins in solution.

The amount of cationic thermosetting resin which can be employed in the resin mixture to bond the paper web is not critical. However, for optimum results it has been found that up to 4.5% by weight of the cationic thermosetting resin can be incorporated in the paper web at any time prior to subsequent impregnation of the paper web with viscose.

While the amount of polyacrylamide resin (either the ionic or non-ionic form) which can be present is also not critical, the amounts employed will generally be determined by the compatibility the polyacrylamide resin exhibits with the cationic thermosetting resin used as well as the desired properties to be obtained in the formed paper webs. Generally, the amount of polyacrylamide resin which can be employed can be from about 0.1% to 1.1% by weight based upon the dry weight of the paper web.

The fibrous food casings produced in accordance with these methods have been found to exhibit improved extensibility characteristics and retention of uniform dimensions—factors which are of importance to commercial food and/or meat packers.

The bonding agent mixture can be used in place of regenerated cellulose as the binder to produce the paper webs. In the method where the bonding agent mixture is added to the beater of the paper making machine containing the fibrous slurry prior to formation of the paper web, bonding of the fibers and curing of the resin mixture occurs when the paper web is substantially dried. In the other method, the paper web is first formed and the resin mixture is applied to the paper web by dipping, coating spraying and so forth. It should be understood that the paper web fibers can be either bonded with the resin mixture alone or in conjunction with conventionally employed regenerated cellulose binder to produce the porous paper webs.

Fibrous casings can then be made from these thusly treated porous paper webs by employing methods such as are described in the U.S. Patents to Shiner (2,910,380) and Smith (2,105,273 and 2,144,990). In any event, it should be understood that regardless of the methods employed to produce the fibrous food casings, the thusly treated paper webs are completely embedded in the casing wall; that is, subsequent impregnation of the paper webs with viscose results in a fibrous, cellulosic food casing wherein the treated paper web is entirely coated by and with the viscose to obtain a regenerated cellulosic food casing having a fibrous web embedded therein.

The present invention will become clearer when considered in light of the following examples which are set forth as being illustrative and exemplary of the present invention and are, in no way, intended to be limitative thereof.

EXAMPLE 1

A comparison of the compatibility of the ionic and non-ionic forms of polyacrylamide resin with a cationic thermosetting resin at various weight concentrations was made utilizing water as the solvent medium and observing the nature of the solution obtained. The results of this determination are set forth in Table I below wherein the column headed "Thermosetting Resin" identifies a polyamide epichlorohydrin resin; the column headed "Non-Ionic" identifies a white, odorless, solid, non-ionic, polyacrylamide resin containing 5.0% by weight volatiles, 0.05% acrylamide monomer and having a bulk density of 30 lbs./cu. ft.; and the column headed "Ionic" identifies an off-white, free flowing powdery, anionic, polyacrylamide resin containing 94.0% to 96.0% by weight solids and a 4% solution having a viscosity of about 80 cps. (Brookfield at 75° F.) and being infinitely dilutable with water but insoluble in most organic solvents.

TABLE I

Concentration of resin in solution (wt. percent).

| Thermosetting resin (polyamide-epichlorohydrin) | Polyacrylamide resin | | Nature of Solution |
|---|---|---|---|
| | Non-Ionic | Ionic | |
| 0.50 | 0.135 | | Clear. |
| 0.50 | 0.25 | | Do. |
| 0.50 | 0.50 | | Do. |
| 0.50 | 1.00 | | Do. |
| 1.00 | 0.13 | | Do. |
| 1.00 | 0.25 | | Do. |
| 1.00 | 0.50 | | Do. |
| 1.00 | 1.00 | | Do. |
| 1.50 | 0.25 | | Do. |
| 1.50 | 0.50 | | Do. |
| 1.50 | 0.75 | | Do. |
| 1.50 | 1.00 | | Do. |
| 0.20 | | 0.10 | Cloudy, clears on shaking. |
| 0.20 | | 0.15 | Do. |
| 0.20 | | 0.20 | Cloudy, slight precipitation. |
| 0.20 | | 0.30 | Do. |
| 0.30 | | 0.10 | Cloudy, clears on shaking. |
| 0.30 | | 0.15 | Do. |
| 0.30 | | 0.20 | Cloudy. |
| 0.40 | | 0.15 | Cloudy, clears on shaking. |
| 0.40 | | 0.20 | Cloudy. |
| 0.60 | | 0.10 | Cloudy, clears on shaking. |

From the results set forth in Table I above, it can be seen that the non-ionic form of polyacrylamide resin is compatible with the thermosetting resin at all levels of concentrations set forth. On the other hand, the ionic form of polyacrylamide resin was observed to be less compatible with the thermosetting resin when the ionic form of the polyacrylamide resin and the thermosetting resin were both present in concentrations of 0.20 weight percent or higher. However, when the concentration of the ionic form of the polyacrylamide resin was less than 0.20 weight percent, the resins appeared to be compatible in solution.

EXAMPLE 2

The effectiveness of bonding paper webs with different bonding agent mixtures after the webs had been formed was determined by hand-bonding sheets of un-bonded paper. The sheets were hand-bonded by first dipping them into an aqueous solution containing a known concentration of each of the resins comprising the bonding agent mixture until the sheets were saturated. The excess liquid was blotted off and the saturated paper sheets were squeeze-dried between layers of absorbent paper. Samples of the thusly treated paper sheets were then mounted in a restraining hoop and placed in an oven to dry and cure. The temperature of the oven was maintained at about 105° C. and the samples were kept in the oven for a period of about 15 minutes.

Upon removal from the oven, the tensile properties of sheets were then determined. The results of these determinations are set forth in Table II below wherein the values listed in the column labeled "Dry Break Strength" were obtained by placing the dried, treated samples in the Instron testing apparatus. The values listed in the column labeled "Wet Break Strength" were obtained by first soaking the treated samples in water until they were thoroughly wet before placing them in the Instron testing apparatus. The values listed in the column labeled "6% NaOH Wet Break Strength" were obtained in the same manner as those for "Wet Break Strength" except that sodium hydroxide (NaOH) was added to the water until a NaOH concentration of about 6% was obtained. At this level of NaOH concentration the solution closely simulates the conditions a paper web would encounter when it is coated with viscose in accordance with commercial casing manufacturing processes since in these processes, viscose normally has a NaOH concentration of about 6%. The values obtained from these tests and listed in Table II are expressed in grams per inch width of sample paper tested.

As is apparent from the results tabulated above, the water wet break strength and the NaOH wet break strength are greater when the resin mixture is employed than when either resin is employed alone. This appears to indicate that an interaction of two resins in mixture occurs upon curing the treated paper. It can also be seen from the results in Table II that the tensile properties of the cured papers appear to increase as the content of each resin in the resin mixture increases.

EXAMPLE 3

Paper webs were obtained from a commercial, papermaking apparatus and were treated by saturating them with an aqueous solution containing a resin mixture comprising a cationic thermosetting resin (polyamide-epichlorohydrin) and the non-ionic form of a polyacrylamide resin. Some of the paper webs were treated solely with a cationic thermosetting resin (polyamide-epichlorohydrin) while others were bonded by acid regenerated viscose and used as a control. The tensile properties of the thusly treated paper webs were determined and the burst pressures of fibrous food casings formed therefrom were also measured. The results obtained are set forth in Table III below wherein the resin content and tensile properties were determined in the same manner as in Example 2 above while the designations, "MD" and "TD" denote the machine direction and the transverse direction, respectively, of the formed, fibrous paper webs. The values listed under the column labeled "Casing Burst Pressures" are expressed in millimeters of mercury and were obtained by closing one end of the formed tubular casings and inflating them with air through their open ends until the casings ruptured.

TABLE III

| Resin content | | Tensile properties of paper webs (gm./in.) | | | | | | Casing burst pressures (mm. Hg) |
|---|---|---|---|---|---|---|---|---|
| Thermosetting resin (polyamide-epichlorohydrin) | Polyacrylamide resin, non-ionic | Dry break strength | | Wet break strength | | 6% NaOH wet break strength | | |
| | | MD | TD | MD | TD | MD | TD | |
| 3.13 | 0 | 2,644 | 2,138 | 888 | 810 | 393 | 383 | 512 |
| 3.77 | 0.45 | 4,593 | 3,645 | 1,041 | 943 | 407 | 363 | 518 |
| 3.86 | 0.77 | 4,039 | 3,645 | 1,160 | 1,099 | 521 | 481 | 499 |
| 3.89 | 1.08 | 4,264 | 3,724 | 1,133 | 1,031 | 507 | 460 | 501 |
| Control (bonded with acid regenerated viscose) | | 5,524 | 4,376 | 1,315 | 1,146 | 329 | 270 | 447 |

The thermosetting cationic resin employed was polyamide-epichlorohydrin while both the ionic and non-ionic forms of the polyacrylamide resin were used. The amount of resin employed was measured as the weight per cent of resin present in the dry paper sheet based upon the dry weight of the untreated paper.

TABLE II

| Resin content | | | Tensile properties (gm./in.) | | |
|---|---|---|---|---|---|
| Thermosetting resin (polyamide-epichlorohydrin) | Polyacrylamide resin | | Dry break strength | Wet break strength | 6% NaOH wet break strength |
| | Non-Ionic | Ionic | | | |
| | | | 1545 | 54 | 27 |
| 0.65 | | | 1750 | 648 | 54 |
| 1.30 | | | 1648 | 643 | 109 |
| 1.95 | | | 1915 | 653 | 127 |
| 0 | 0.33 | | 1845 | 68 | 23 |
| 0 | 0.65 | | 2020 | 73 | 27 |
| 0 | 0.98 | | 2270 | 86 | 27 |
| 0.65 | 0.33 | | 1990 | 699 | 123 |
| 0.65 | 0.65 | | 2195 | 685 | 159 |
| 0.65 | 0.98 | | 3050 | 773 | 218 |
| 1.30 | 0.33 | | 2020 | 735 | 390 |
| 1.30 | 0.65 | | 2720 | 863 | 472 |
| 1.30 | 0.98 | | 3120 | 827 | 485 |
| 1.95 | 0.33 | | 2480 | 780 | 454 |
| 1.95 | 0.65 | | 2930 | 950 | 555 |
| 1.95 | 0.98 | | 3500 | 855 | 595 |
| 0.52 | | 0 | 2025 | 654 | 100 |
| 0.63 | | 0 | 1900 | 680 | 54 |
| 0.52 | | 0.20 | 2420 | 1050 | 254 |
| 0.61 | | 0.13 | 2170 | 725 | 181 |
| 0.59 | | 0.30 | 2895 | 1130 | 407 |

A comparison of the results set forth in Table III above reveals that the tensile properties of the paper webs treated with the resin mixture are significantly higher than those obtained from the paper webs treated with only the cationic thermosetting resin. Similarly, the burst pressure of fibrous food casings utilizing paper webs bonded with either the polyamide-epichlorohydrin resin alone or with the resin mixture are significantly higher than the fibrous food casing formed from the paper web as the control.

EXAMPLE 4

The uniformity of extensibility of fibrous food casings formed from a paper web bonded with a resin mixture comprising polyamide-epichlorohydrin and the non-ionic form of a polyacrylamide resin was determined and compared with those fibrous food casings obtained from a paper web bonded with acid regenerated viscose.

The paper webs employed as substrates in fabricating the fibrous food casings were obtained by slitting a master roll in the machine direction to obtain a plurality of lesser rolls having narrower widths representing center, intermediate and end cuts across the width of the master roll. In this way, the conditions under which a casing manufacturer would operate in selecting a paper web sustrate in the fabrication of fibrous food casings was closely simulated.

The extensibility characteristics of the formed casings were determined by measuring the diameter of the wet casing when inflated to an internal air pressure of about 150 mm. Hg. At this air pressure, the normal stuffing pressure encountered under commercial stuffing operating conditions was simulated.

The ratios of the diameter of the casings fabricated with paper webs selected from various cut locations on a master roll to the diameter of the casing fabricated with a paper web representing the center cut on a master roll were also calculated to demonstrate the differences in extensibility of the various casings.

The results obtained are set forth in Table IV below wherein the amount of resin mixture present in the dried paper web was measured at 3.77% by weight for the polyamide-epichlorohydrin resin and 0.45% by weight for the non-ionic form of polyacrylamide resin. The letters A–J, inclusive, identify the location of the cuts on the master roll from which the lesser rolls were obtained. Letters A and J signify the extreme end cuts on the master roll, letter E signifies the center cut and letters B–D and F–H denote the intermediate cuts between cut locations A–E and E–J respectively.

TABLE IV

| Paper web bonded with— | Cut locations from master roll of paper web | | | | | | | | | |
|---|---|---|---|---|---|---|---|---|---|---|
|  | A | B | C | D | E | F | G | H | I | J |
| Acid regenerated viscose: |  |  |  |  |  |  |  |  |  |  |
| Wet diameter of casing at 150 mm. Hg (in.) | 4.15 | 4.09 | 4.07 | 4.03 | 4.02 | 4.04 | 4.03 | 4.06 | 4.06 | 4.10 |
| Casing diameter to center cut (E) | 1.032 | 1.018 | 1.012 | 1.002 | 1.000 | 1.005 | 1.002 | 1.010 | 1.010 | 1.020 |
| Resin mixture (3.77% by wt. polyamide-epichlororohydrin+0.45% by wt. non-ionic polyacrylamide): |  |  |  |  |  |  |  |  |  |  |
| Wet diameter of casing at 150 mm. Hg (in.) | 4.11 | 4.05 | 4.04 | 4.02 | 4.01 | 4.01 | 4.02 | 4.04 | 4.07 | 4.09 |
| Casing diameter to center cut (E) | 1.025 | 1.010 | 1.007 | 1.002 | 1.000 | 1.000 | 1.002 | 1.007 | 1.015 | 1.020 |

From the results tabulated in Table IV above, it can be seen that the uniformity of extensibility of food casings formed from paper webs bonded with the resin mixture is significantly improved over food casings formed from paper webs bonded solely with acid regenerated viscose.

While the present invention has been set forth in some detail and described with particularity, it should be understood that it is susceptible to changes, modification and alterations without departing from the scope and spirit of the invention.

What is claimed is:

1. A paper web employed as a substrate in the manufacture of fibrous food casings, said paper web being characterized by being bonded with a resin mixture comprising a cationic thermosetting resin and a polyacrylamide resin selected from the class consisting of an ionic and a non-ionic polyacrylamide resin, said ionic polyacrylamide resin being present in said mixture in an amount of less than about 50% by weight and the ratio of said cationic thermosetting resin to said non-ionic polyacrylamide resin present in said mixture being from about 1:2 to 11.5:1; said resin mixture being present in said paper web in an amount at least effective to provide that strength to said paper web necessary for the manufacture of fibrous food casings but less than an amount which would interfere with viscose penetration of the thusly bonded paper web.

2. The paper web of claim 1 wherein the cationic thermosetting resin is selected from the group consisting of the reaction products of an epichlorohydrin and a polyamide, a modified melamine and formaldehyde and modified urea and formaldehyde.

3. The paper web of claim 2 wherein the cationic thermosetting resin is polyamide-epichlorohydrin and the polyacrylamide resin is the non-ionic form thereof.

4. A paper web employed as a substrate in the manufacture of fibrous food casings, said paper web being characterized by being bonded with a resin mixture comprising from between about 0.5% to 4.5% by weight, based upon the dry weight of said paper web, of a cationic thermosetting resin selected from the group consisting of the reaction products of an epichlorohydrin and a polyamide, a modified melamine and formaldehyde and modified urea and formaldehyde, and from between about 0.1% to 1.1% by weight, based upon the dry weight of said paper web, of a polyacrylamide resin selected from the class consisting of an ionic and a non-ionic polyacrylamide resin, said ionic polyacrylamide resin, being present in said mixture in an amount of less than about 50% by weight.

5. The paper web of claim 4 wherein the cationic thermosetting resin is polyamide-epichlorohydrin and the polyacrylamide resin is the non-ionic form thereof.

6. A tubular, cellulosic food casing having a paper web embedded therein, said paper web being characterized by being bonded with a resin mixture comprising a cationic thermosetting resin and a polyacrylamide resin selected from the class consisting of an ionic and a non-ionic polyacrylamide resin, said ionic polyacrylamide resin being present in said mixture in amount of less than about 50% by weight and the ratio of said cationic thermosetting resin to said non-ionic polyacrylamide resin present in said mixture being from about 1:2 to 11.5:1; said resin mixture being present in said paper web in an amount at least effective to provide that strength to said paper web necessary for the manufacture of fibrous food casings but less than an amount which would interfere with viscose penetration of the thusly bonded paper web.

7. The food casing of claim 6 wherein the cationic thermosetting resin is selected from the group consisting of the reaction products of an epichlorohydrin and a polyamide, a modified melamine and formaldehyde and modified urea and formaldehyde.

8. The food casing of claim 7 wherein the cationic thermosetting resin is polyamide-epichlorohydrin and the polyacrylamide resin is the non-ionic form thereof.

9. A tubular, cellulosic food casing having a paper web embedded therein, said paper web being characterized by being bonded with a resin mixture comprising from between about 0.5% to 4.5% by weight, based upon the dry weight of said paper web, of a cationic thermosetting resin selected from the group consisting of the reaction products of an epichlorohydrin and a polyamide, a modified melamine and formaldehyde and modified urea and formaldehyde, and from between about 0.1% to 1.1% by weight, based upon the dry weight of said paper web, of a polyacrylamide resin selected from the class consisting of an ionic and a non-ionic polyacrylamide resin, said ionic polyacrylamide resin being present in said mixture in an amount of less than about 50% by weight.

10. The food casing of claim 9 wherein the cationic thermosetting resin is polyamide-epichlorohydrin and the polyacrylamide resin is the non-ionic form thereof.

11. A method for producing a tubular cellulosic food casing having a paper web embedded therein including the steps of:

(a) impregnating a paper web with a resin mixture comprising a cationic thermosetting resin and a polyacrylamide resin selected from the class consisting of an ionic and a non-ionic polyacrylamide resin, said ionic polyacrylamide resin being present in said mixture in an amount of less than about 50% by weight and the ratio of said cationic thermosetting resin to said non-ionic polyacrylamide resin present in said mixture being from about 1:2 to 11.5:1; said resin mixture being present in an amount at least effective to provide that strength to said paper web necessary for the manufacture of food casings but less than an amount which would interfere with viscose penetration of the thusly impregnated paper web;

(b) heating the thusly impregnated paper web until said resin mixture is cured; and, (c) forming a tubular, cellulosic food casing having said paper web embedded therein by coating said paper web with viscose and regenerating the viscose in said food casing.

12. The method of claim 11 wherein the cationic thermosetting resin is selected from the group consisting of the reaction products of an epichlorohydrin and a polyamide, a modified melamine and formaldehyde and modified urea and formaldehyde.

13. The method of claim 12 wherein the cationic thermosetting resin is polyamide-epichlorohydrin and the polyacrylamide resin is the non-ionic form thereof.

14. The method of claim 12 wherein the paper web is impregnated with said resin mixture by adding said resin mixture to the fibrous slurry prior to forming said paper web.

15. The method of claim 12 wherein the paper web is impregnated with said resin mixture by applying said resin mixture to the paper web after it has been formed but prior to coating said paper web with viscose.

References Cited

UNITED STATES PATENTS

| | | | |
|---|---|---|---|
| 3,135,613 | 6/1964 | Underwood | 99—176 |
| 3,378,379 | 4/1968 | Shiner et al. | 99—176 |
| 3,386,880 | 6/1968 | Lomas | 162—168 |

HYMAN LORD, Primary Examiner

U.S. Cl. X.R.

99—174, 176; 117—95, 145; 161—229; 162—164